Aug. 30, 1960  R. S. RAE  2,950,593
COMPOUND ENGINE
Filed Nov. 22, 1954  7 Sheets-Sheet 1

RANDOLPH SAMUEL RAE,
INVENTOR.

BY R. E. Geauque
ATTORNEY

Aug. 30, 1960

R. S. RAE 2,950,593

COMPOUND ENGINE

Filed Nov. 22, 1954

RANDOLPH SAMUEL RAE,
INVENTOR.

BY R. E. Geangue

ATTORNEY

Aug. 30, 1960 R. S. RAE 2,950,593
COMPOUND ENGINE
Filed Nov. 22, 1954 7 Sheets-Sheet 3

RANDOLPH SAMUEL RAE,
INVENTOR.

BY R. E. Grangue

ATTORNEY

Aug. 30, 1960  R. S. RAE  2,950,593
COMPOUND ENGINE

Filed Nov. 22, 1954  7 Sheets—Sheet 4

RANDOLPH SAMUEL RAE,
INVENTOR.

BY R. E. Grangue

ATTORNEY

RANDOLPH SAMUEL RAE,
INVENTOR.

BY R. E. Geangue

ATTORNEY

Aug. 30, 1960   R. S. RAE   2,950,593
COMPOUND ENGINE

Filed Nov. 22, 1954   7 Sheets-Sheet 7

RANDOLPH SAMUEL RAE,
INVENTOR.

BY R. E. Geauque

ATTORNEY

United States Patent Office 2,950,593
Patented Aug. 30, 1960

2,950,593

COMPOUND ENGINE

Randolph Samuel Rae, Santa Monica, Calif., assignor to The Garrett Corporation, Los Angeles, Calif., a corporation of California Filed Nov. 22, 1954, Ser. No. 470,238

9 Claims. (Cl. 60—35.6)

This invention relates to a compound engine which is powered by a non-air breathing power source and by the combustion of atmospheric air taken into the engine, and more particularly to an engine in the which the non-air breathing power source is connected to the compressor for the engine.

Present types of turbo prop engines and turbo jet engines utilize a compressor to compress the entering air and a combustion chamber is provided for burning this compressed air to increase its temperature and pressure. The products of combustion drive a turbine which is directly connected to the compressor and this turbine exhausts to atmosphere producing a jet thrust. In turbo prop engines, the propeller is also driven by the turbine whereas in a pure turbo jet type of engine, the turbine drives only the compressor. At high altitudes, these engines must exert a considerable amount of power on the atmospheric air in order to obtain a sufficiently high discharge pressure from the compressor for continued combustion in the combustion chamber and to prevent flame-out. Thus, the celing of these present type engines is limited because of the fact that sufficient high pressure air cannot be supplied to the combustion chamber.

By the present invention it is proposed to drive the compressor of either a turbo prop or a turbo jet engine by a non-air breathing engine such as disclosed in pending U.S. Application Serial No. 417,867 filed March 22, 1954 by Randolph Samuel Rae and entitled "Non-Air Breathing engines." Any suitable type of liquid or gas can be utilized by the engine as fuel such as liquid hydrogen, gasoline, methane, acetylene alcohol and the like and the fuel can be combusted by any suitable oxidant, such as air, oxygen, hydrogen peroxide, nitric acid, etc. in either the liquid or gaseous phase. Both the fuel and the oxidant can be carried in separate tanks in the mounting craft for the engine and supplied to the engine in the desired ratio. Since the non-air breathing component of the present invention is directly connected to the compressor, the power transmitted to the compressor is independent of the atmospheric pressure and higher pressure ratios can be obtained at high altitude in order to raise the maximum ceiling which can be obtained before flame-out occurs. In addition, an excess of fuel is supplied to the non-air breathing engine as a diluent so that the exhaust from the engine is still rich in fuel, and this exhaust can be utilized in a combustion chamber supplied with atmospheric air in order to produce high temperature products of combustion for driving the turbine. This turbine can be directly connected to both the compressor and the propeller as in a turbo prop engine or can be solely connected to the compressor as in a turbo jet engine. Also, a certain amount of the fuel in the exhaust from the non-air breathing engine can be transmitted to an afterburner located aft of the turbine in order to obtain additional thrust by burning part of the exhaust gases in the afterburner. When low temperature hydrogen and oxygen are utilized as the fuel and oxidant, respectively, for the non-air breathing engine, it is possible to have a high percentage of unburned hydrogen fuel in the exhaust from the engine together with some steam. Various types of non-air breathing engines can be utilized with the invention and can be made very small for the required output so that such an engine can be located within the duct of the compound engine. It will be understood that the compound engine of this invention is capable of delivering more power per unit weight of fuel than prior types of engines and that the compound engine operates more efficiently.

It is therefore an object of the present invention to provide a compound engine in which a non-air breathing component is utilized to drive a compressor and the exhaust from this non-air breathing engine is utilized by a combustion chamber to burn atmospheric air and drive a turbine.

Another object of the present invention is to provide an engine component for driving a compressor, which component is independent of atmosphere so that higher pressure ratios can be obtained at high altitudes.

A still further object of the present invention is to provide a turbo jet engine in which the compressor is driven by a non-air breathing engine and by a turbine which is driven by the combustion products resulting from combustion of the exhaust from the non-air breathing engine.

Another object of the invention is to provide a turbo prop engine in which the compressor is driven by a non-air breathing engine and the exhaust from the non-air breathing engine is combusted to drive a turbine connected to both a compressor and a propeller.

These and other objects of the invention not specifically set forth above will become readily apparent from the accompanying description and drawings in which.

Figure 1:
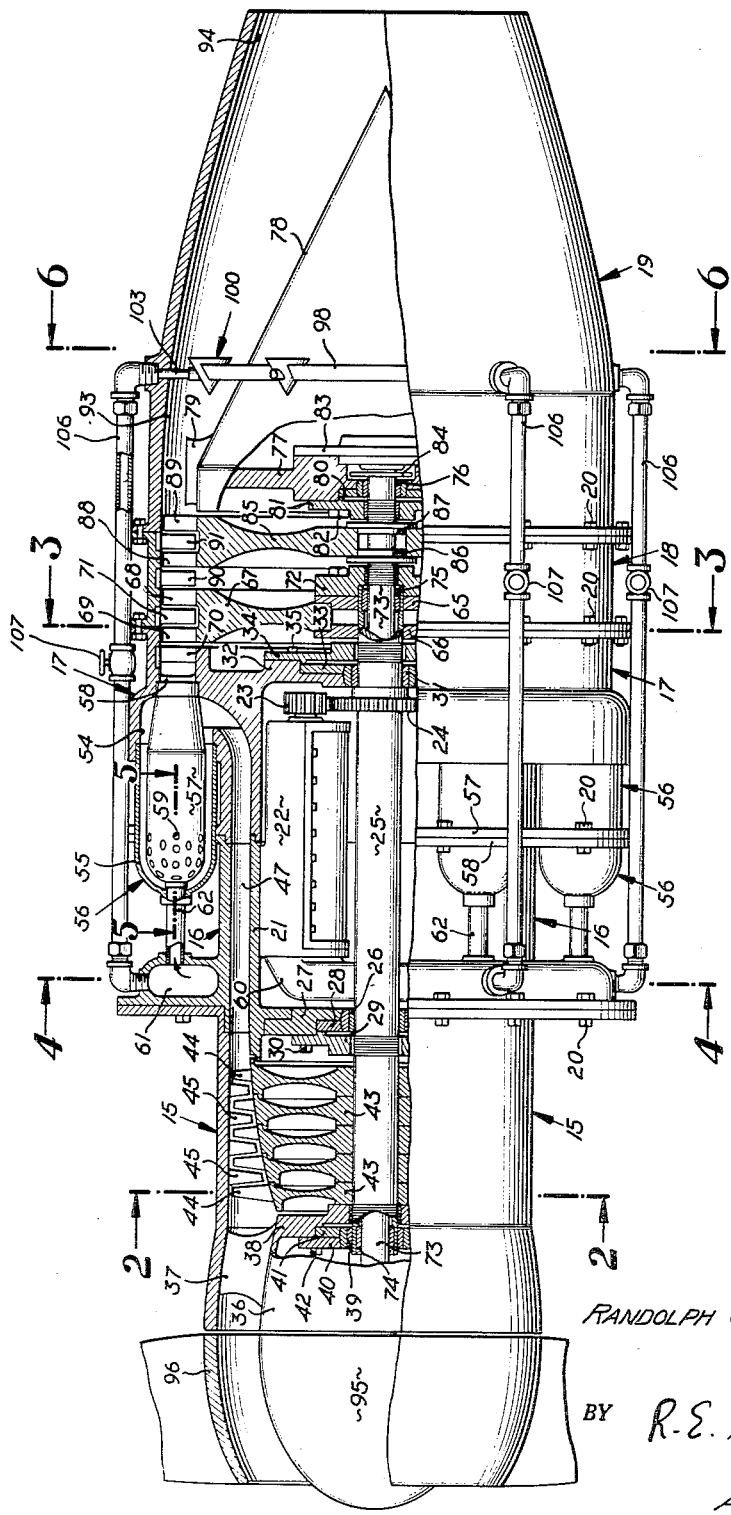
Figure 1 is a side elevational view of the turbo prop form of the invention with parts cut away in order to show the non-air breathing engine connected to the compressor and the turbine connected to both the compressor and the propeller.

Referring to the turbo prop form of the invention illustrated in Figure 1, the compound engine is comprised of a plurality of casing sections 15, 16, 17, 18 and 19 positioned successively from the forward end of the engine and secured together by bolts 20. The section 17 has an extension 21 in the form of an internal cylindrical member which supports the non-air breathing engine 22, the construction of which will be later described. The drive shaft of the engine 22 carries gear 23 which meshes with gear 24 in order to drive cylindrical shaft 25. The shaft 25 is mounted by a bearing 26 which is retained by member 27 connected to the extension 21 and by ring 28. A sealing member 29 is secured to the member 27 by bolt 30 and serves to retain ring 28. The shaft 25 is also supported by bearing 31 which is retained by extension 32 of casing section 17 and by a ring 33. A sealing member 34 is secured to extension 32 by a bolt 35 and serves to retain ring 33. A cylindrical member 36 is supported within casing section 15 by means of a number of struts 37, and an extension 38 secured to member 36 serves as a sealing means for shaft 25 and also serves to position retaining members 40 and 41 by means of bolt 42. Thus, the bearings 26, 31 and 39 serve to support the shaft 25 for rotation by the non-air breathing engine 22.

Figure 2:
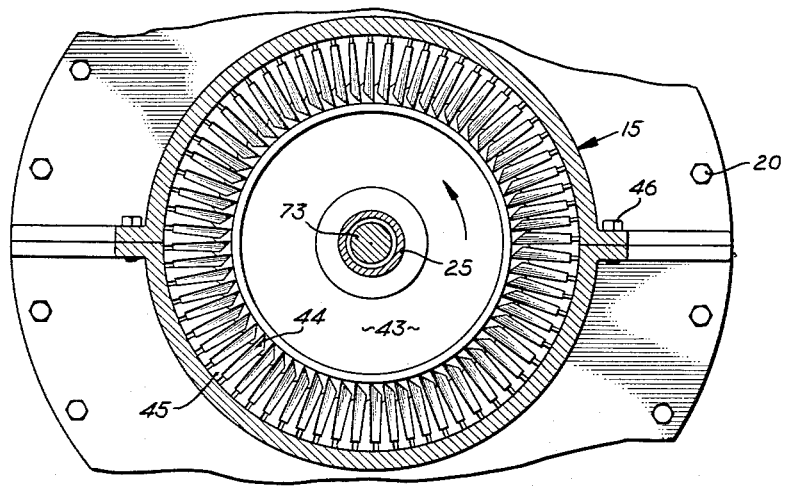
Figure 2 is a transverse vertical section along line 2—2 of Figure 1 showing the construction of the compressor.
Figure 3:
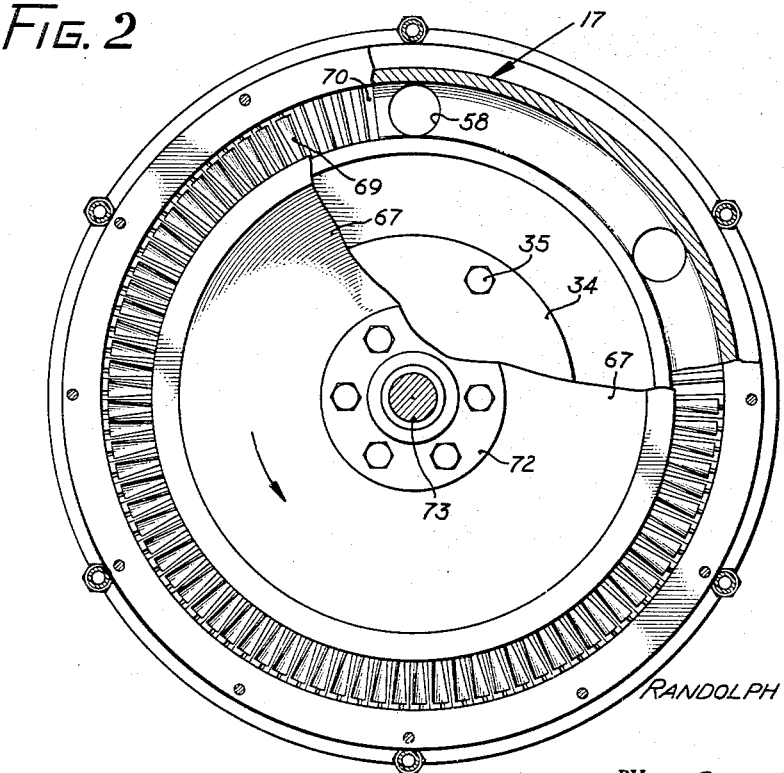
Figure 3 is a transverse vertical section along line 3—3 of Figure 1 illustrating the construction of the turbine.

A plurality of compressor hubs 43 are secured to shaft 25 at a position between bearings 26 and 39 and each of these hubs carry a row of compressor blades 44 which cooperate with rows of stationary blades 45 carried by casing section 15 (see Figure 2). The rotation of the compressor blades serves to increase the pressure of the air entering the engine through the casing section 15 and around the member 36. The compressor wheels 43 are interlocked at their ends in order to form a smooth flow surface for the incoming air. As illustrated in Figure 2, the casing section 15 is split in order to permit easy assembly by means of bolts 46.

Figure 4:
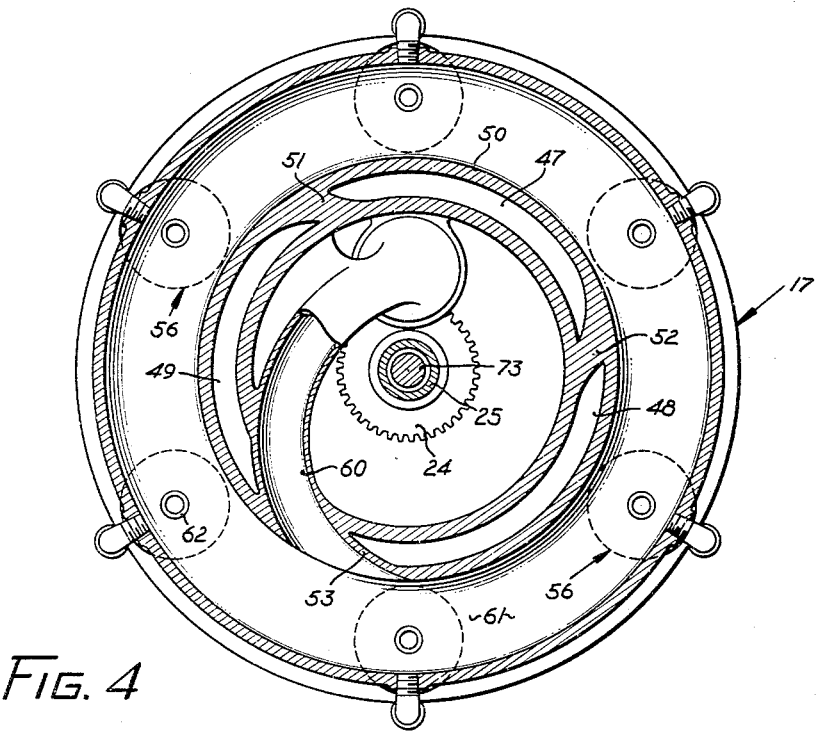
Figure 4 is a transverse vertical section along line 4—4 of Figure 1 showing the manner in which the exhaust from the engine is conducted to the various combustion chambers and also illustrating the air intake passages for the engine.

The air compressed by the compressor blades 44 enters passages 47, 48 and 49 which are formed between extension 21 and casing sections 16 and 17 and which are separated by the partitions 51, 52 and 53 (see Figure 4). The three passages 47, 48 and 49 terminate in a chamber 54 formed in casing sections 17 and the chamber has a plurality of openings each of which receives the end of an outer chamber 55 for a combustion chamber 56. Six such combustion chambers are equally spaced around the circumference of the engine and are held in position by flange 57 of section 17 and flange 58 of section 16. An inner chamber 57 is positioned within each of the combustion chambers 56 and extends to connect with passage 58 formed in casing section 17. A plurality of openings 59 are positioned in the forward end of each inner casing 57 so that the air entering the chamber 54 from passages 47, 48 and 49 passes to the forward end of the inner chamber 57 and through the openings 59.

Figure 5:
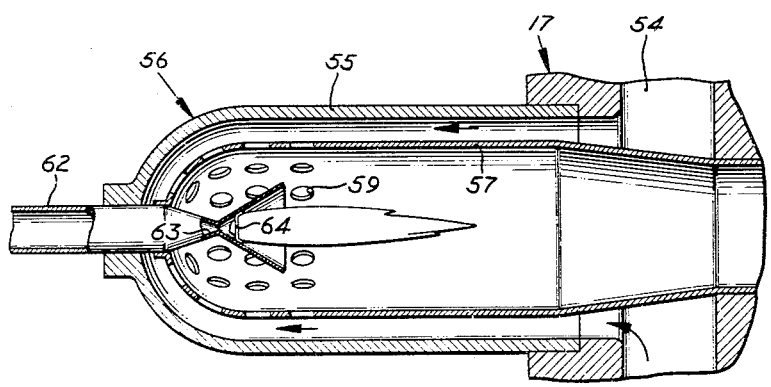
Figure 5 is a horizontal section along line 5—5 of Figure 1 showing the construction of the combustion chambers.

The exhaust from the non-air breathing engine 22 is led through a passage 60 formed in partition 53 to a manifold 61 formed in casing section 16. Manifold 61 is circular in form in order to supply the exhaust from the non-air breathing engine to each of the combustion chambers through a passage 62, which leads through outer chamber 55 to the interior of inner chamber 57 (see Figure 5). The passage 62 terminates within chamber 57 in a convergent-divergent section 63 and the divergent portion contains a wire screen 64 for supporting a catalyst which serves to maintain the combustion of the gaseous fuel entering from passage 62 with the compressed air entering from chamber 54. The end of shaft 25 carries hub members 65 and 66 which carry a turbine wheel 67 having two rows of blades 68 and 69 which cooperate with rows of stationary blades 70 and 71 carried by casing section 17 and 18 respectively. An end sealing member 72 is secured to hub members 65 and 66 in order to seal the open end of the shaft 25. Thus, both the turbine wheel 67 and the non-air breathing engine 22 are connected to the shaft 25 in order to drive the compressor blades 44.

A shaft 73 is positioned within the hollow shaft 25 and is mounted concentrically with the shaft by bearings 74 and 75 located at opposite ends of the shaft 25. The rear end of the shaft 73 is also supported by bearing 76 which is positioned by a projection 77 and by a ring 80. The projection 77 is supported by a conical member 78 which is positioned in the aft end of the engine by struts 79 secured to casing section 19. A sealing member 81 is secured to projection 77 by a bolt 82 and serves to retain ring 80. Also, an end plate 83 is secured to projection 77 and an oil agitation 84 is located between the end plate and the bearing 76.

A turbine wheel 85 is secured to shaft 73 by hub members 86 and 87 and the wheel 85 carries two rows of blades 88 and 89 which cooperate with stationary rows of blades 90 and 91 carried by casing section 18. The turbine wheels 67 and 85 and conical member 78 form the passage 93 which leads to the exhaust opening 94 located at the aft end of the engine. The forward end of the shaft 73 projects through cylindrical member 36 and connects with a hub 95 of a propeller 96 (not shown). Thus, it is apparent that the turbine wheel 85 serves to drive the propeller 96 through shaft 73 which passes through the compressor shaft 25. The sealing members 81 and 34 and the end plate 83 serve to confine the driving fluid for wheels 67 and 85 and member 72 serves to prevent this fluid from entering shaft 25. Also the sealing members 29 and 38 confine the driving fluid for the compressor.

Figure 6:
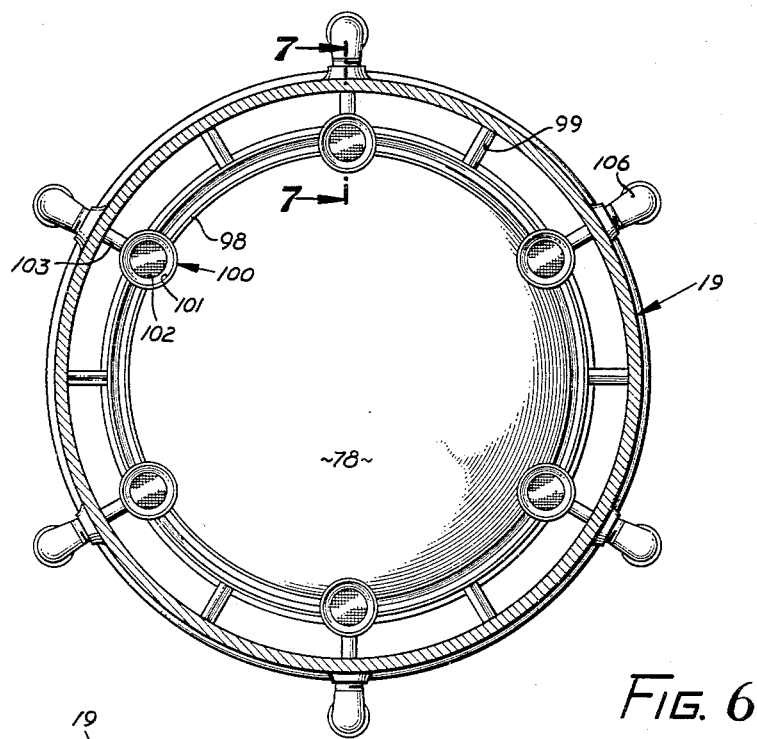
Figure 6 is a vertical section along line 6—6 of Figure 1 showing the construction of the afterburner which is connected to the exhaust manifold of the non-air breathing engine.

An afterburner is located within the section 19 and comprises a circular V-shaped support ring 98 which passes around the conical member 78 (see Figure 6) and this ring is secured in position by a plurality of struts 99. Six flame holders 100 are evenly spaced around the ring 98 and are in the form of a conical section 101 which supports a screen 102. Fuel is supplied to each of the flame holders through a passage 103 which terminates in a jet 104 within the conical section 101 and the jet is directed against a catalyst 105, such as finely divided platinum, deposited on the wire screen 102. Each of the passages 103 connects with a longitudinal passage 106 located exteriorly of the engine. Each passage 106 leads to the manifold 61 and contains a valve 107 to control the amount of fuel flowing to each of the flame holders. An electrical ignition device of well known construction (not shown) is provided for each of the combustion chambers 56 within the inner chamber 57 in order to maintain the combustion of the fuel entering through passage 62 with the compressed air from passage 47.

Figure 11:
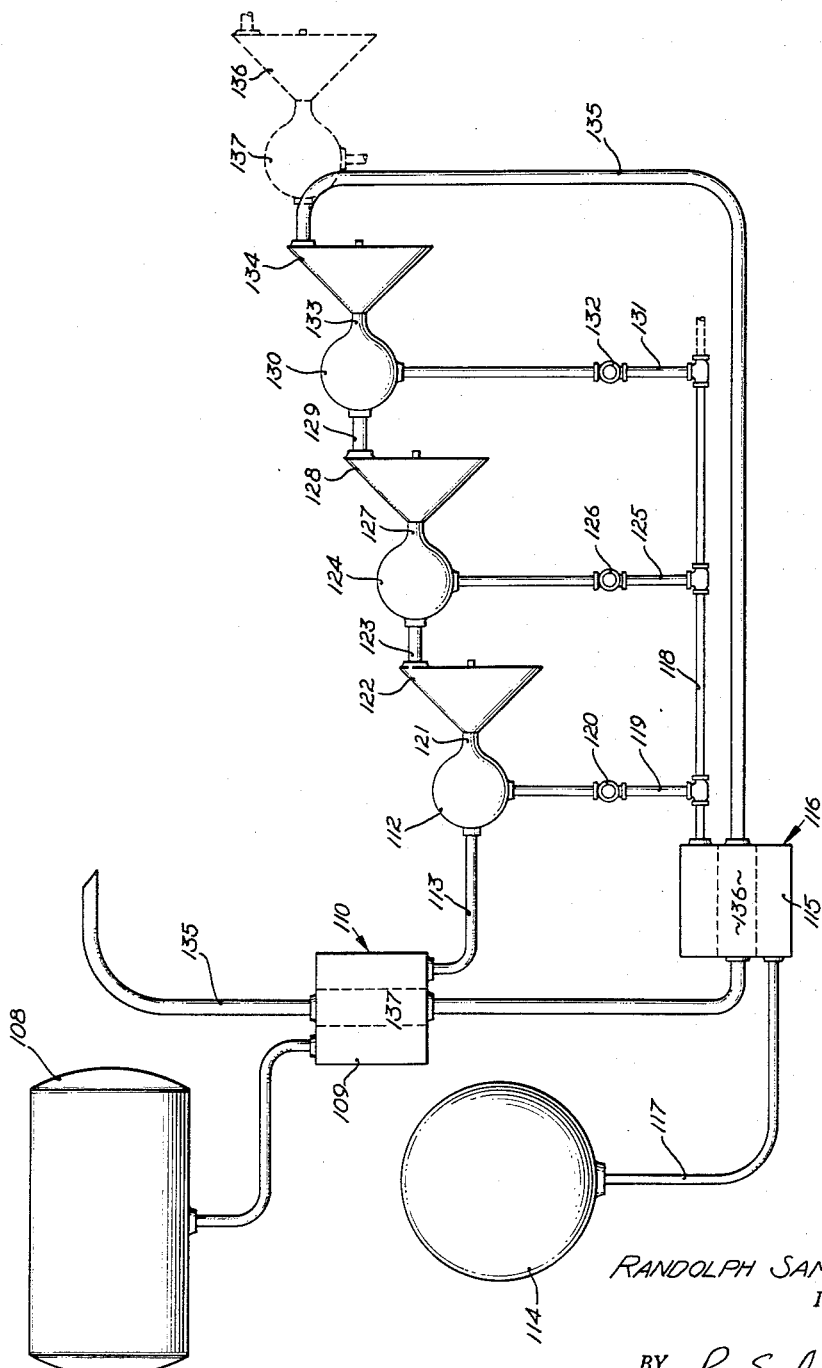
Figure 11 is a diagrammatic view of the cycle for one form of non-air breathing engine which can be utilized in the invention.

While any suitable form of non-air breathing engine can be utilized as the engine 22, a schematic arrangement of one such engine is illustrated in Figure 11. A fuel tank 108 is connected to outer chamber 109 of heat exchanger 110 by passage 111 and combustion chamber 112 is connected to outer chamber 109 by passage 113. The tank 108 contains a suitable fuel, such as hydrogen, gasoline, methane, acetelyn, alcohol or the like, either in the liquid or gaseous state. The fuel can be stored at a high pressure within tank 108 in order to obtain a high efficiency in the working cycle of the engine. A separate tank 114 is utilized to carry the oxidant for the engine and the tank is connected to outer chamber 115 of heat exchanger 116 through passage 117. The combustion chamber 112 is connected to outer chamber 115 by a passage 118 and a passage 119 containing a valve 120 for regulating the amount of oxidant supplied to the combustion chamber. Any suitable oxidant, such as oxygen, hydrogen peroxide, nitric acid, etc. can be utilized in either the liquid or gaseous phase and can be held at a high pressure in tank 114 to increase the efficiency of the engine. When liquid fuel and oxygen are used, both will be vaporized before entering the combustion chamber by heat exchangers 110 and 116 respectively, and the amount of oxidant passing to combustion chamber 112 will be controlled by valve 120 so that the temperature of the gases leaving the combustion chamber 112 will be the maximum that can be withstood by the construction materials of the first stage. The combustion chamber 112 is connected by a passage 121 to the first expansion stage 122 and the passage 121 will contain both gaseous fuel and the by-products of the combustion reaction. For instance, when liquid hydrogen is utilized as the fuel and liquid oxygen as the oxidant, the passage 121 will contain both hydrogen and steam resulting from combustion of part of the hydrogen, whereas if a hydrocarbon is utilized as the fuel, the passage 121 will contain an amount of hydrocarbon plus various combustion products, such as carbon dioxide, carbon monoxide and steam.

First stage 112 of the engine will exhaust at a lower temperature through a passage 123 to a second combustion chamber 124 and a regulated amount of oxygen will be led to combustion chamber 124 from passage 118 through passage 125 and valve 126. In combustion chamber 124, some more of the fuel will be ignited with sufficient oxidant to raise the temperature in passage 127 to that which can be withstood by the second expansion stage 128 of the engine and the combustion chamber 124 will reduce the amount of fuel and increase the amount of combustion products. The stage 128 exhausts through passage 129 to a third combustion chamber 130 and the expansion of the gases through stage 128 results in a lower temperature in passage 129. Additional oxidant is added to the combustion chamber 130 from passage 118 through a passage 131 and valve 132 and the amount of oxidant is controlled by valve 132 so that the temperature in passage 133 leading from the combustion chamber 130 will be raised until it is at a temperature which can be withstood by the third expansion stage 134 of the engine. The stage 134 exhausts to passage 135 which passes through inner chambers 136 and 137 of heat exchangers 116 and 110, respectively, to increase the temperature of the oxidant entering heat exchanger 116 and of the fuel entering heat exchanger 110.

Any number of stages can be added to the engine, such as stage 136 having a combustion chamber 137, and oxidant can be supplied to the combustion chamber 137 from passage 118. In general, a practical number of stages can be utilized so as to obtain a reasonable compromise between the specific fuel consumption and the mechanical complexity for the particular application under consideration. The temperature of the gases leaving the combustion chamber is regulated by the amount of oxidant supplied to the combustion chambers through valves 120, 126 and 132. It is not necessary that fuel and oxidant be at a high pressure in tanks 108 and 114 respectively since pumps can be added to the passages 111 and 117 in order to increase the pressure in these passages leading to the heat exchangers 110 and 116, respectively. While each stage is illustrated as being an expansion turbine, it is understood that any one of the stages could consist of any other suitable type of power producing unit, such as an expansion type gas engine. The non-air breathing engine 22 thus operates independently of the atmosphere since the engine carries its own fuel and oxidant supply and each stage of the engine operates at as high a temperature as possible in order to obtain maximum efficiency for each stage.

The operation of the turbo prop form of the invention will now be described and, for purposes of description, the non-air breathing engine will be supplied with liquid hydrogen as fuel and with liquid oxygen as the oxidant. The non-air breathing engine 22 is adjusted so that the exhaust from the engine through passage 60 will contain a high percentage of unburned hydrogen gas (such as 40 percent) and the steam resulting from the combustion of the other portion of the hydrogen gas. The non-air breathing engine 22 will drive the compressor blades 44 through the shaft 25 and since the engine 22 operates independent of the atmosphere, it is apparent that a large amount of power is available for the compressor in order to compress the incoming air to a high pressure regardless of the low atmospheric pressures encountered at high altitudes. The exhaust in passage 60 enters manifold 61, and a portion of the exhaust is led to each of the combustion chambers 66 where the hydrogen gas is combusted within the combustion chamber with the high pressure air in passage 47. The high pressure, high temperature combustion products leaving each of the combustion chambers through passage 58 serve to drive the turbine wheels 65 and 85 and the exhaust from these turbines is discharged through opening 94 in section 19 in order to produce a jet thrust for the aircraft. The expansion of the combustion products drives the turbine wheel 67, which is connected to outer shaft 25 in order to aid the non-air breathing engine 22 and driving the compressor blades. The rotation of turbine wheel 85 by the expansion of the combustion products drives the inner shaft 73 in order to power the propeller 96. A regulated amount of exhaust from engine 22 can be led to the flame holders of the afterburner through the passages 106 in order to burn a portion of the hydrogen gas in manifold 61 and provide increased jet thrust from the opening 94. Thus, the turbo prop form of the invention is suitable for high altitude operation since it utilizes separate fuel and oxidant supplies for the engine 22 so that this engine operates independently of the surrounding atmosphere. The non-air breathing engine 22 serves solely to drive the compressor and the combustion chambers burn the exhaust from this engine with compressed air to produce jet thrust and power for the compressor and propeller. The only oxidant supply that need be carried by the aircraft is that needed by the non-air breathing engine 22. Therefore, the invention provides a compound engine which utilizes a non-air breathing engine and combustion chambers located between the compressor and the turbine wheels.

Figure 8:
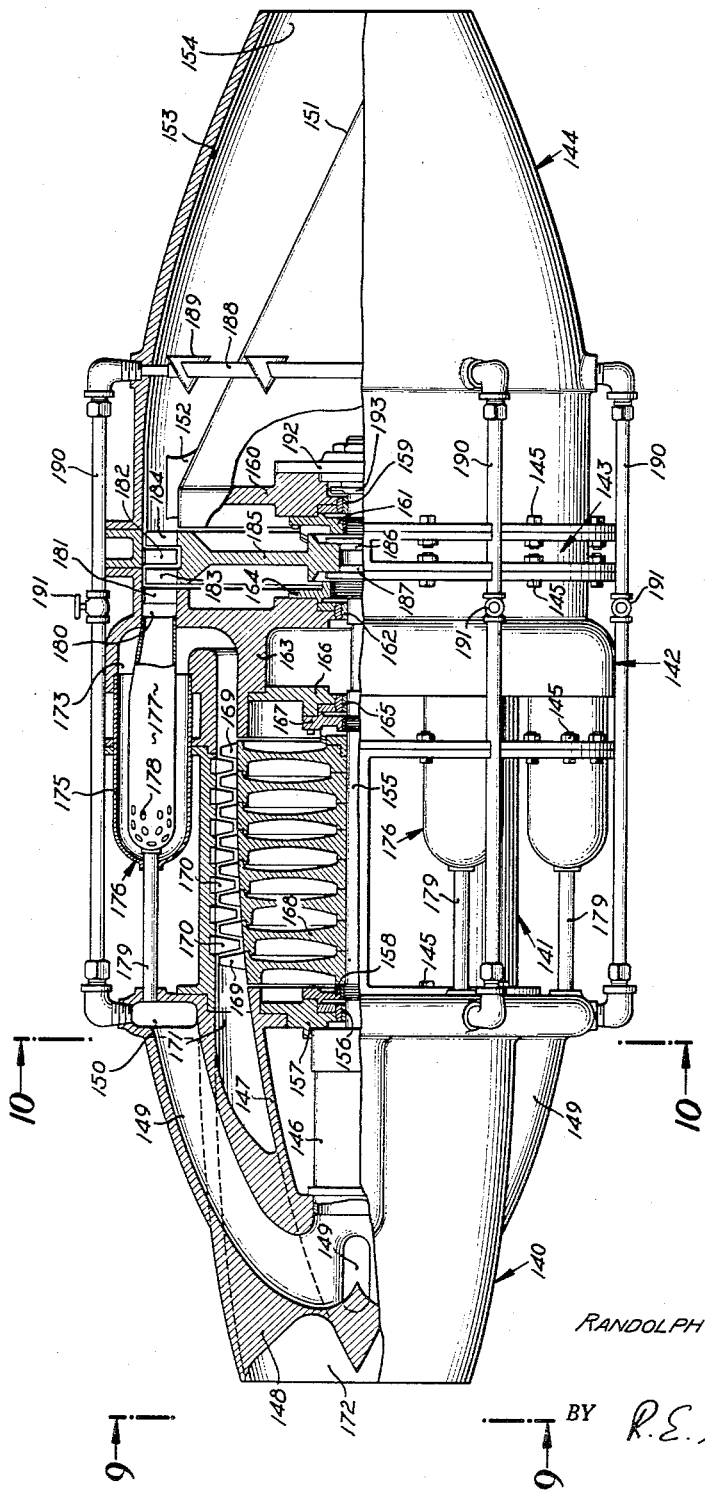
Figure 8 is a side elevational view of the turbo jet form of the invention with parts cut away in order to show the compressor, the turbine, and the non-air breathing engine component.
Figure 9:
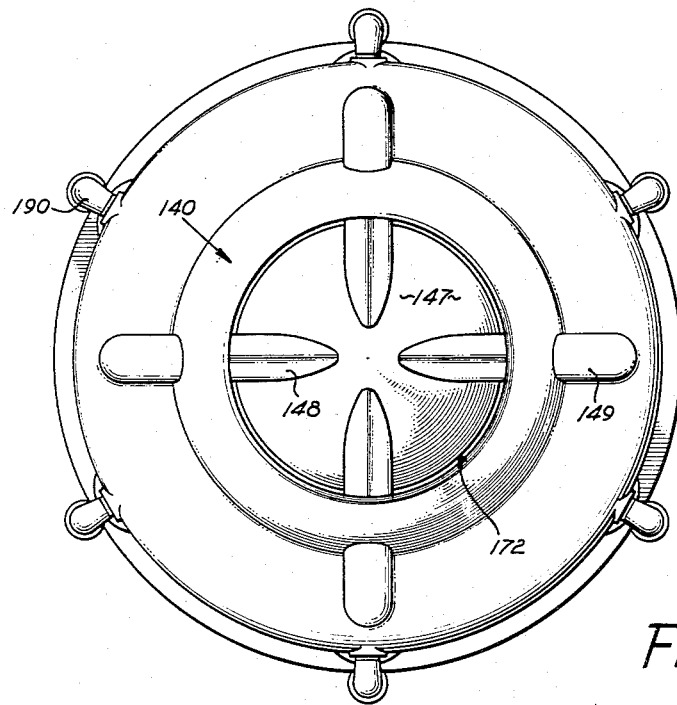
Figure 9 is an end elevational view along line 9—9 of Figure 8 showing the exhaust passages from the non-air breathing engine to the manifold for the combustion chambers.
Figure 10:
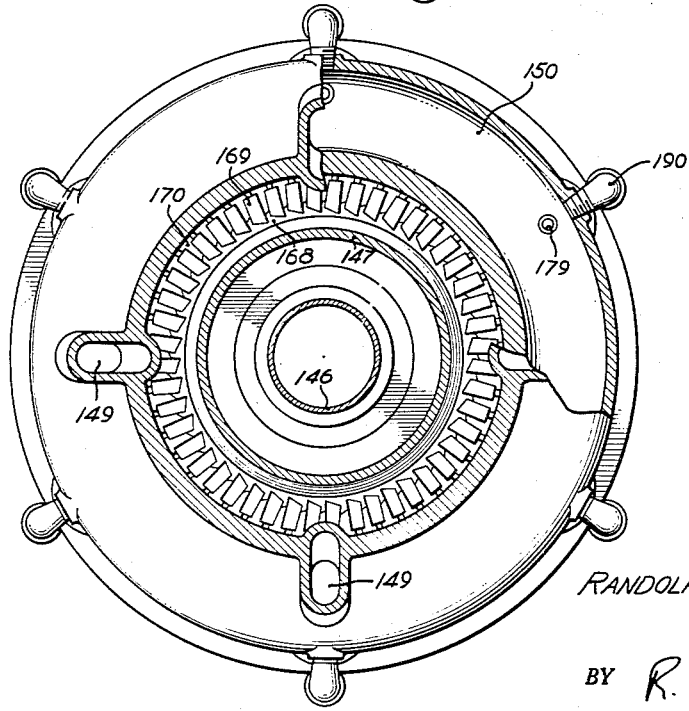
Figure 10 is a vertical section along line 10—10 of Figure 8 showing the construction of the compressor for the turbo jet form of the invention.

Referring now to the turbojet form of the invention illustrated in Figure 8, this form of the invention has casing sections 140, 141, 142, 143 and 144 which are all secured together by bolts 145. A non-air breathing engine 146 is located within a nose section 147 which is supported from casing section 140 by four struts 148, each of which contains a passage 149 leading through the section 140 and connecting with a manifold 150. The passages 149 serve to collect the exhaust from the non-air breathing engine 146 and supply this exhaust to the manifold 150.

A conical member 151, similar in shape to conical member 78 of the first form of the invention is supported within casing section 144 by means of struts 152 and the space between the member 151 and casing 144 provides a passage 153 leading to the end opening 154. A shaft 155 is centrally located within the engine and has one end connected to the non-air breathing engine 146. This end of the shaft 8 is supported by a bearing 156 which is positioned by a member 157 secured to the nose member 147 and sealing member 158 helps to retain the bearing. The other end of the shaft is supported by a bearing 159 positioned by an extension 160 from the conical member 151 and sealing member 161 serves to retain this bearing. The shaft is also supported intermediate its ends by a bearing 162 positioned by an extension 163 from casing section 142 and the casing section also carries a sealing member 164. In addition, a bearing 165 is supported by an extension 166 secured to extension 163 and the member 166 carries a sealing member 167.

A plurality of compressor hubs 168 are secured to the shaft 155 between the bearings 156 and 165 and each of the hubs carry a row of blades 169 which cooperate with rows of stationary blades 170 carried by casing section 141. The nose section 147 and the compressor hubs 168 form an annular air passage 171 in which the compressor blades are located and these blades serve to compress the air entering the entrance opening 172 for the engine and deliver the compressed air to a chamber 173 formed in casing section 142. As in the previous form of the invention, the chamber 173 is closed by the outer chamber 175 of each of six combustion chambers 176 and an inner chamber 177 is positioned within each of the outer chambers 175 and contains a number of openings 178. Each of the inner containers 177 is also connected through a passage 179 to the manifold 150 which receives the exhaust from the non-air breathing engine 146. Each passage 179 terminates in a converging-diverging section similar to section 63 of Figure 5 and the combustion chambers maintain the combustion of the exhaust gases with the compressed air which enters the chambers through openings 178.

Figure 7:
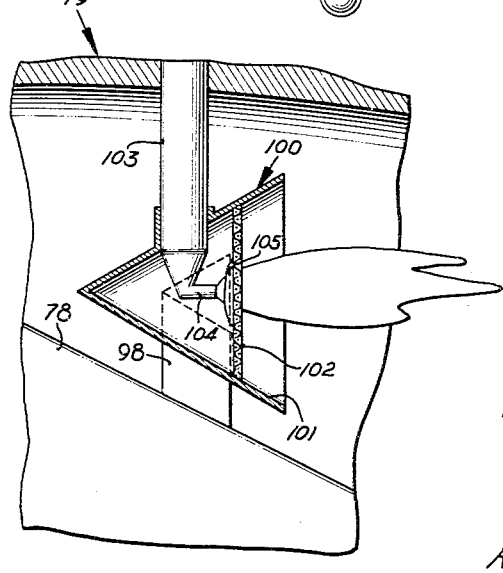
Figure 7 is a vertical section along line 7—7 of Figure 6 showing one of the flame holders for the afterburner.

The high temperature, high pressure gas from the combustion chambers 176 enters space 180 which contains a row of stationary blades 181 supported by casing section 142. A second row of stationary blades 182 are carried by the casing section 143 and these stationary blades 181 and 182 cooperate with rows of rotating blades 183 and 184 carried by the turbine wheel 185 which is secured by members 186 and 187 to the shaft 155. After the gases in the combustion chambers 176 pass through the turbine blades, the gases are exhausted out of nozzle opening 154 in order to provide jet thrust for the aircraft. An afterburner is located within the passage 153 and is formed of annular V-shaped ring 188 which supports six cone members 189, each containing a screen having a catalyst deposited thereon in the same manner as shown in Figure 7. Each of the cone members 189 is connected with the manifold 150 through a passage 190 which contains a valve 191 to regulate the amount of fuel passing from the manifold 150 to the afterburner. It is understood that the combustion chambers 176 and the non-air breathing engine 146 can be of the same construction as described in connection with the combustion chambers 56 and non-air breathing engine 22 of the first form of the invention and that the physical form of the afterburner is identical with the afterburner of the first form. An end plate 192 secured to extension 160 and serves to seal off the end of the shaft 155 which carries an oil agitator 193.

Referring now to the operation of the second form of the invention, the non-air breathing engine 146 operates upon a liquid fuel supply and a liquid oxygen supply, such as hydrogen and oxygen, respectively. Within this engine, a portion of the hydrogen is combusted in order to drive the compressor blade 169 independently of the surrounding atmosphere. The exhaust from this engine contains a high percentage of unburned fuel, such as about forty percent, together with steam resulting from combustion of the other part of the hydrogen and the exhaust passes to manifold 150 through passages 149. The exhaust in manifold 160 containing hydrogen fuel, is led to combustion chambers 176 where the fuel is ignited with the compressed air from chamber 173. The high temperature, high pressure gas leaving the combustion chambers serves to drive the turbine wheel 185 which is connected to shaft 155 and aids the non-air breathing engine 146 in driving the compressor blades to compress the entering air. The gases leaving the blades of the turbine wheel 185 exhaust at high pressure from opening 154 in order to provide the jet thrust for the aircraft. Since the fuel and oxidant for the non-air breathing engine are carried separately within the vehicle, the non-air breathing engine will drive the compressor independently of the surrounding atmosphere and will produce a high compressor output even at very high altitudes where low pressure atmospheric air is present. Thus, sufficient high pressure air can be supplied to the combustion chambers for igniting the hydrogen fuel in the exhaust from the non-air breathing engine and the total thrust of the engine will be developed by the combustion of the hydrogen with the compressed air. A regulated portion of the fuel in manifold 150 will be supplied to the afterburner in order to increase the jet thrust of the engine in a well-known manner.

It is understood that the passage 135 of the non-air breathing engine connects with passage 60 in the first form of the invention and with passages 149 in the second form of the invention. In both forms of the invention, an excess of fuel is supplied through passage 113 of the non-air breathing engine so that not all of the fuel is combusted in the engine and a quantity of uncombusted fuel is received by passage 135. Also, in both forms of the invention, the output shafts of all stages of the non-air breathing engine are connected together to drive the shaft for the compressor.

By the present invention, a compound engine is provided in which the compressor is driven by a non-air breathing engine to obtain a high discharge pressure from the compressor for continued combustion in the combustion chambers at high altitudes where prior types of jet engines do not develop sufficient power to produce the discharge pressure required to prevent flame-out. Since a very high power output can be obtained from a non-air breathing engine of very small size, it is convenient to locate the engine within the duct of the compound engine and directly connect it to the compressor. While one form of non-air breathing engine has been described for purposes of illustration, it is understood that other types of such engines can be utilized and suitable fuel and oxidant storage means can be associated with the engine. Also, the engine can be operated either with or without the afterburner. It is understood that the number of combustion chambers and the particular compressor and turbine construction illustrated can be varied in any well-known manner. Since the power delivered to the compressor by the non-air breathing engine is independent of atmosphere, high pressure ratios can be obtained by the present invention at high altitudes and thus the maximum ceiling of the aircraft can be raised before flame-out occurs. Various other modifications are contemplated by those skilled in the art without departing from the spirit and scope of the invention as hereinafter defined by the appended claims.

What is claimed is:

1. A compound engine for propelling an aircraft comprising a casing defining a fluid passage having an exhaust opening, compressor means located in the forward portion of said casing for compressing air entering said passage and turbine means connected with said compressor means and located rearwardly thereof in said casing, combustion chamber means located in said fluid passage between said compressor means and turbine means and utilizing compressed air from said compressor means to maintain combustion therein, and a non-air breathing engine located within said casing and having separate fuel and oxidant supplies carried by said aircraft, said non-air breathing engine being connected to said compressor means to continually drive said compressor means during flight independently of the atmosphere to increase the efficiency of said engine and produce operative pressure ratios across said compressor means at high altitudes in order to increase the flight ceiling of said aircraft.

2. A compound engine as defined in claim 1 wherein the exhaust from said non-air breathing engine contains a quantity of uncombusted fuel, and means for connecting said exhaust with said combustion chamber means in order to burn at least a portion of said uncombusted fuel with the compressed air from said compressor means, said turbine means being driven by the discharge from said combustion chamber means and said uncombusted fuel being the sole fuel source for said combustion chamber means.

3. A compound engine as defined in claim 2 having afterburner means located behind said turbine means and means for connecting the exhaust from said non-air breathing engine with said afterburner means so that a part of the uncombusted fuel in the exhaust can be combusted in said afterburner means.

4. A compound engine as defined in claim 1 having propeller means located at the forward end of said casing, said turbine means having one portion connected to said propeller means and another portion connected to said compressor means, said propeller means and the fluid exhausting from said opening being operable to jointly propel said aircraft.

5. A compound engine as defined in claim 1 wherein said non-air breathing engine comprises a plurality of stages supplied from second combustion chamber means, said fuel and oxidant supplies being combusted within said second combustion chamber means and the products of combustion being supplied to each stage at a temperature which can be withstood by each stage.

6. A compound power unit for propelling a vehicle in the atmosphere comprising a casing defining a through fluid passage having an exhaust opening, compressor means located within said casing for compressing atmospheric air entering said casing, a non-air breathing engine connected to said compressor means for continually driving said compressor means, separate supplies of fuel and oxidant carried by said vehicle for use by said engine, said engine having first combustion means wherein only a portion of the fuel supplied to said engine is combusted with said oxidant, turbine means located within said casing and connected with said compressor means, and second combustion means located within said casing between said compressor means and said turbine means and connected with the fuel-rich exhaust from said engine and with the compressed air from said compressor means, the combustion in said second combustion means of the fuel in said exhaust with the compressed air providing a working fluid for said turbine means and for discharge from said exhaust opening to produce jet thrust for said vehicle.

7. A compound power unit as defined in claim 6 wherein said fuel supply is liquid hydrogen and said oxidant supply is liquid oxygen, said fuel-rich exhaust being discharged from said engine in the gaseous phase so that said second combustion means combusts hydrogen gas with compressed air.

8. A compound power unit for propelling an aircraft comprising a casing defining a through fluid passage having an exhaust opening, compressor means located within said casing for compressing atmospheric air entering said casing, a non-air breathing engine located within said casing and connected to said compressor means for continually driving said compressor means, a supply of liquid oxygen carried by said aircraft as the oxidant for said engine, a supply of liquid hydrogen carried by said aircraft as the fuel for said engine, said engine comprising combustion chamber means receiving oxygen from the oxidant supply and hydrogen from the fuel supply and turbine expansion means for producing the shaft power output of said engine, said combustion chamber means receiving an excess of hydrogen so that the exhaust from said engine contains a quantity of hydrogen fuel, turbine means located in said casing downstream of said compressor means and connected with said compressor means, second combustion chamber means located in said casing between said compressor means and said turbine means, and means for connecting said exhaust with said second combustion chamber means so that fuel in said exhaust can be combusted with compressed air within said second combustion chamber means to provide a working fluid for said turbine means.

9. A compound power unit for propelling an aircraft comprising a casing defining a fluid passage having an exhaust opening, compressor means located in said casing for compressing air entering said passage, turbine means connected with said compressor means and located rearwardly thereof in said casing, combustion chamber means located in said fluid passage between said compressor means and turbine means and utilizing compressed air from said compressor means to maintain combustion therein, an engine located within said casing and having a fuel supply and an oxidant supply, said engine being connected to said compressor means to continually drive said compressor means during flight of said aircraft, the exhaust from said engine containing a quantity of uncombusted fuel, and means for connecting said combustion chamber means with said exhaust to provide a fuel supply for said combustion chamber means.

References Cited in the file of this patent

UNITED STATES PATENTS

| 664,958 | Linde | Jan. 1, 1901 |
| 2,411,552 | New | Nov. 26, 1946 |
| 2,455,845 | Wells | Dec. 7, 1948 |
| 2,511,385 | Udale | June 13, 1950 |
| 2,519,624 | Ballantyne et al. | Aug. 22, 1950 |
| 2,531,761 | Zucrow | Nov. 28, 1950 |
| 2,611,239 | Briggs | Sept. 23, 1952 |
| 2,620,625 | Phaneuf | Dec. 9, 1952 |
| 2,636,343 | Painter | Apr. 28, 1953 |
| 2,648,317 | Mikulasek et al. | Aug. 11, 1953 |